US012744458B2

(12) United States Patent
Wang

(10) Patent No.: US 12,744,458 B2
(45) Date of Patent: Sep. 22, 2026

(54) ACTIVE CURRENT LIMITING CIRCUIT, POWER SUPPLY DEVICE, POWER SUPPLY SYSTEM AND CONTROL METHOD

(71) Applicant: Aplus Power Technology (Hangzhou) Co., Ltd., Hangzhou City (CN)

(72) Inventor: Yuetian Wang, Hangzhou City (CN)

(73) Assignee: Aplus Power Technology (Hangzhou) Co., Ltd., Hangzhou City (CN)

( * ) Notice: Subject to any disclaimer, the term of this patent is extended or adjusted under 35 U.S.C. 154(b) by 215 days.

(21) Appl. No.: 18/448,798

(22) Filed: Aug. 11, 2023

(65) Prior Publication Data

US 2024/0055985 A1 Feb. 15, 2024

(30) Foreign Application Priority Data

Aug. 12, 2022 (CN) ......................... 202210970049.4

(51) Int. Cl.
*H02M 3/155* (2006.01)
*H02M 1/42* (2007.01)

(52) U.S. Cl.
CPC ............. *H02M 3/155* (2013.01); *H02M 1/42* (2013.01)

(58) Field of Classification Search
CPC ................................ H02M 3/155; H02M 1/42
See application file for complete search history.

(56) References Cited

U.S. PATENT DOCUMENTS 5,663,635 A * 9/1997 Vinciarelli ............ H02M 7/217 323/224
6,646,842 B2 * 11/2003 Pan ........................ H02H 9/001 361/111

(Continued)

FOREIGN PATENT DOCUMENTS

CN 101296599 A 10/2008
CN 101399490 A 4/2009

(Continued)

OTHER PUBLICATIONS

Selection of Power Factor Corrector for Modular Uninterruptable Power Supply System, Ilya Galkin (Year: 2010).*
1 English translation of CN-113938019-A. (Year: 2022).
Mingyang et al., "Method for Realizing DC Output of Wind Turbine Based on Diode Rectifier", High Voltage Engineering, vol. 47, No. 8, Aug. 31, 2021, 13 pages.
Xuezhe et al., "Principle and Design of Wireless Charging System for Electric Vehicles", Tongji University Press, Mar. 31, 2021, pp. 170-174.
English translation of CN216648036 (Year: 2022).

(Continued)

*Primary Examiner* — Crystal L Hammond
*Assistant Examiner* — Samantha L Faubert
(74) *Attorney, Agent, or Firm* — Hamilton, Brook, Smith & Reynolds, P.C.

(57) ABSTRACT

Embodiments of this disclosure provide an active current limiting circuit, a power supply device, a power supply system and a control method, wherein at least one bidirectional switch in the active current limiting circuit is turned on or off based on the current sampling signal obtained by sampling the current in the bidirectional switch in the active current limiting circuit. With the active current limiting circuit, the inrush current generated in switching the power supply lines may be efficiently reduced, power consumption may be lowered, output of large power may be provided, the capacitor may be charged and sufficient power output may be provided to the load. And furthermore, the bidirectional switch in the active current limiting circuit may be flexibly controlled based on the current sampling signal, thereby improving operating efficiency of the active current limiting circuit.

18 Claims, 8 Drawing Sheets

(56) References Cited

U.S. PATENT DOCUMENTS 8,564,394 B2 10/2013 Li et al.
8,964,410 B2 2/2015 Chang et al.
10,243,449 B1 * 3/2019 Young .................. H02M 1/088
10,881,773 B2 1/2021 Rudser et al.
10,931,206 B2 2/2021 Yamada
10,965,208 B2 * 3/2021 Sharma ................ H02M 5/225
12,200,867 B2 1/2025 Wang
12,348,152 B2 7/2025 Wang
2002/0017971 A1 2/2002 Koyama et al.
2005/0083665 A1 4/2005 Nakashima et al.
2005/0189566 A1 9/2005 Matsumoto et al.
2006/0034109 A1 2/2006 Benabdelaziz et al.
2007/0152795 A1 7/2007 Zeng et al.
2008/0074204 A1 3/2008 Ichikawa et al.
2008/0076484 A1 3/2008 Veselic
2009/0045897 A1 2/2009 Yang et al.
2009/0309684 A1 12/2009 Tsai et al.
2010/0033282 A1 2/2010 Hsu et al.
2010/0045590 A1 2/2010 Kumamoto et al.
2011/0032683 A1 2/2011 Li et al.
2011/0127833 A1 6/2011 Wu et al.
2012/0098632 A1 4/2012 Markowski et al.
2012/0099288 A1 4/2012 Parish
2013/0188329 A1 7/2013 Chang et al.
2013/0257390 A1 10/2013 Jin et al.
2014/0169042 A1 6/2014 Eguchi
2015/0078042 A1 3/2015 Standing
2018/0191263 A1 7/2018 Chida et al.
2018/0197673 A1 7/2018 Njiende et al.
2018/0205323 A1 7/2018 Cai et al.
2019/0076587 A1 3/2019 Rudser et al.
2019/0122806 A1 4/2019 Chou et al.
2019/0140551 A1 5/2019 Lu et al.
2019/0148061 A1 5/2019 Lu et al.
2019/0378645 A1 12/2019 Chiang et al.
2020/0153178 A1 5/2020 Zhang et al.
2020/0320966 A1 10/2020 Clark et al.
2021/0134520 A1 5/2021 Koki
2021/0272737 A1 9/2021 Jin et al.
2021/0305907 A1 9/2021 Dong et al.
2021/0315112 A1 10/2021 Song et al.
2022/0037074 A1 2/2022 Tashiro
2023/0170127 A1 6/2023 Yuetian et al.
2023/0170819 A1 6/2023 Wang
2023/0170820 A1 6/2023 Wang
2023/0171892 A1 6/2023 Wang
2024/0038441 A1 2/2024 Jiang et al.
2024/0072646 A1 2/2024 Wang

FOREIGN PATENT DOCUMENTS

CN 102082495 A 6/2011
CN 101615496 B 8/2012
CN 202502877 U 10/2012
CN 102881405 A 1/2013
CN 103368371 A 10/2013
CN 103516193 A 1/2014
CN 103973097 A 8/2014
CN 104749426 A 7/2015
CN 105099131 A 11/2015
CN 105099160 A 11/2015
CN 105281570 A 1/2016
CN 206388585 U 8/2017
CN 107147094 A * 9/2017 ........... H02H 7/1227
CN 107210681 A 9/2017
CN 207459970 U 6/2018
CN 207612194 U 7/2018
CN 108667337 A 10/2018
CN 109787484 A 5/2019
CN 209516901 U 10/2019
CN 112104201 A 12/2020
CN 212659384 U 3/2021
CN 212936301 U 4/2021
CN 213305278 U 5/2021
CN 214101195 U 8/2021
CN 113452271 A 9/2021
CN 214154343 U 9/2021
CN 214626409 U 11/2021
CN 113938019 A 1/2022
CN 114050025 A 2/2022
CN 217955633 U 12/2022
EP 1626493 A1 2/2006
JP 2011-087367 A 4/2011
WO 2008/149530 A1 12/2008
WO 2015/106643 A1 7/2015

* cited by examiner

ACTIVE CURRENT LIMITING CIRCUIT, POWER SUPPLY DEVICE, POWER SUPPLY SYSTEM AND CONTROL METHOD

RELATED APPLICATION

This application claims priority under 35 U.S.C. § 119 or 365 to China Application No. 202210970049.4, filed Aug. 12, 2022. The entire teachings of the above application are incorporated herein by reference.

TECHNICAL FIELD

This disclosure relates to the field of power supply, and in particular to an active current limiting circuit, a power supply device, a power supply system and a control method.

BACKGROUND

In a power supply system, it is necessary for a power supply to meet two aspects of redundancy design: redundancy design for input power supply and redundancy design for power supply. In a conventional single input power supply, in order to achieve redundant design of input power supply, that is, when one path of input loses power, it is necessary to ensure normal output of the entire power supply. If a certain power supply system requires N power supplies, N+N power supplies are needed to achieve redundant design of input power supply, wherein N power supplies are connected to input power supply A, and the other N power supplies are connected to input power supply B. On the basis of N+N power supplies, it is possible to achieve redundant design of power supplies, that is, if one of the power supplies fails, other N+N−1 power supplies may still meet the needs of N power supplies.

Another power supply architecture is use of an ATS (automatic transfer switch) power supply. The ATS power supply refers to a power supply with a function of automatically transferring between two input power supplies, and its working principle is that when both paths of input are normal, the transfer switch of the ATS power supply selects one path for power supply, and when the power supply of this path loses power, the transfer switch of the ATS power supply may switch to the other path for power supply. The power supply architecture adopts N power supplies to meet the redundancy design of input power supply. When one path of input loses power, the redundancy design of input may be achieved by transfer of the ATS power supply. On the basis of N power supplies, in order to achieve redundancy design of the power supply, it is necessary to add one power supply, that is, N+1 power supplies may achieve redundancy of input power supply and redundancy design of power supply.

However, for ATS power supplies, in transferring the input power supply by the transfer switch of the ATS power supply, the input power supply may have a large inrush current on bulk capacitance at the output side of a power factor correction (PFC) circuit. For example, input power supply A initially supplies power, and at this moment, input power supply A powers off, in order to meet input ride via, it needs to wait for half a power frequency cycle Ts/2 (10 ms) to cut off input power supply A, and then cut in power supply B. At present, the transfer switch of the ATS power supply mainly uses a relay, and a transfer time Trelay of the relay is about 5 ms. Therefore, after the input power supply A powers off for Ts/2+2Tree, a voltage of the bulk capacitor will be decreased due to an output load. When the input power supply B is cut in, if a voltage at the time of cut in is much higher than the bulk voltage, and if there is no current limiting circuit on the line, there will be a large inrush current to the bulk capacitor, causing damage to a previous power supply device.

In order to solve the problem of inrush current of the ATS power supply, an existing method is to increase a capacity of the bulk capacitor, so that the voltage of the bulk capacitor is still greater than the input voltage after the time of Ts/2+2Tree; and another method is to add a current limiting circuit in the line, and a resistive passive current limiting circuit is commonly used at present.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, in order to solve the problem of inrush current of an ATS power supply, increasing the capacity of the bulk capacitor will lead to an increase in cost, power loss and the volume of the power supply, and flexible control is unable to be achieved; and a current limiting circuit needs to be able to provide high-power output to charge a bulk capacitor and provide load output. If a resistive passive current limiting circuit is used, the volume of the power supply will be relatively large, there will also be significant power loss, furthermore, flexible control is unable to be achieved.

Addressed to at least one of the above problems, embodiments of this disclosure provide an active current limiting circuit, a power supply device, a power supply system and a control method. With the active current limiting circuit, the inrush current generated in switching the power supply lines may be efficiently reduced, power consumption may be lowered, output of large power may be provided, the capacitor may be charged and sufficient power output may be provided to the load. Furthermore, the bidirectional switches in the active current limiting circuit may be flexibly controlled by using the current sampling signal, thereby improving operating efficiency of the active current limiting circuit.

According to a first aspect of the embodiments of this disclosure, there is provided an active current limiting circuit, applicable to a power supply system, the power supply system comprising at least two input power supply lines, an input bus, a power factor correction circuit, a capacitor, and the active current limiting circuit, the power factor correction circuit being coupled via the input bus to the at least two input power supply lines that are able to be switched, and the capacitor being connected to an output side of the power factor correction circuit, and the active current limiting circuit comprising: a bidirectional switch unit comprising at least one bidirectional switch, wherein an input end of the bidirectional switch unit is connected to the input bus, and an output end of the bidirectional switch unit is connected to the power factor correction circuit, the bidirectional switch unit being configured to turn on or off the at least one bidirectional switch according to a current sampling signal in the bidirectional switch unit.

According to a second aspect of the embodiments of this disclosure, there is provided a power supply device, the power supply device including the active current limiting circuit as described in the first aspect.

According to a third aspect of the embodiments of this disclosure, there is provided a power supply system, the power supply system including at least two input power supply lines, an input bus, a power factor correction circuit, a capacitor, and the active current limiting circuit as described in the first aspect, the power factor correction circuit being coupled via the input bus to the at least two input power supply lines that are able to be switched, and the capacitor being connected to an output side of the power factor correction circuit.

According to a fourth aspect of the embodiments of this disclosure, there is provided a method for controlling an active current limiting circuit, the method including: sampling currents in a bidirectional switch unit of the active current limiting circuit as described in the first aspect to obtain a current sampling signal; generating a control signal for controlling turning on or off of at least one bidirectional switch according to the current sampling signal; and driving the bidirectional switch according to the control signal to charge the capacitor or limit currents.

An advantage of the embodiments of this disclosure exists in that at least one bidirectional switch in the active current limiting circuit is turned on or off based on the current sampling signal obtained by sampling the current in the bidirectional switch in the active current limiting circuit. With the active current limiting circuit, the inrush current generated in switching the power supply lines may be efficiently reduced, power consumption may be lowered, output of large power may be provided, the capacitor may be charged and sufficient power output may be provided to the load. Furthermore, the bidirectional switch in the active current limiting circuit may be flexibly controlled based on the current sampling signal, thereby improving operating efficiency of the active current limiting circuit.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

The accompanying drawings described herein are for explanation only, and are not intended to limit the scope of this disclosure in any way. In addition, shapes and proportional dimensions of the components in the drawings are illustrative only and are intended to assist in understanding this disclosure, but are not intended to specifically limit the shapes and proportional dimensions of the components in this disclosure. With the teachings of this disclosure, those skilled in the art may choose various possible shapes and proportional sizes according to specific circumstances to implement this disclosure.

DETAILED DESCRIPTION

A description of example embodiments follows.

The technical solutions of this disclosure shall be explained below in detail with reference to the accompanying drawings and specific embodiments. It should be understood that these embodiments are only used to illustrate this disclosure and not to limit the scope of this disclosure. After reading this disclosure, all modifications to various equivalent forms of this disclosure by those skilled in the art will fall within the scope of the claims attached to this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

All technical and scientific terms used herein have the same meanings as commonly understood by those skilled in the art to which this disclosure pertains, unless otherwise defined. The terminology used in the description of this disclosure is for the purpose of describing particular embodiments and is not intended to limit this disclosure. The term "and/or" as used herein includes any and all combinations of one or more of the associated listed items.

Embodiment 1

The embodiments of this disclosure provide an active current limiting circuit. The active current limiting circuit is applicable to a power supply system, the power supply system including at least two input power supply lines, an input bus, a power factor correction circuit, a capacitor, and the active current limiting circuit.

Figure 1:
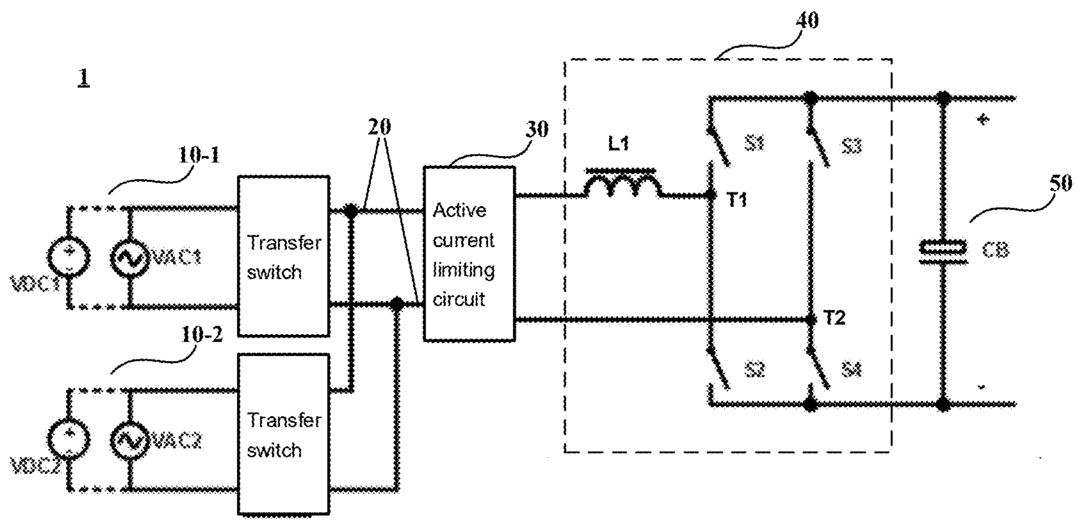
FIG. 1 is a circuit structure diagram of a power supply system where an active current limiting circuit is located in an embodiment of this disclosure.

FIG. 1 is a circuit structure diagram of the power supply system where the active current limiting circuit is located in the embodiment of this disclosure. As shown in FIG. 1, a power supply system 1 includes two input power supply lines 10-1 and 10-2, an input bus 20, an active current limiting circuit 30, a power factor correction circuit 40, and a capacitor 50. The capacitor 50 is, for example, a bulk capacitor, i.e. a capacitor CB in FIG. 1.

As shown in FIG. 1, the power factor correction circuit 40 is coupled to two input power supply lines 10-1 and 10-2 able to be switched via the input bus 20, the capacitor 50 is connected to an output side of the power factor correction circuit 40, and the active current limiting circuit 30 is arranged between the input bus 20 and the power factor correction circuit 40. The input bus 20 is connected to positive and negative ends of the output side of the transfer switch of the two input power supply lines 10-1 and 10-2.

In FIG. 1, two power supply lines are taken as examples for illustration, but this disclosure may also include three or more power supply lines, such as N+N power supply lines, where, N is a positive integer. In addition, as shown in FIG. 1, in the power supply lines, a transfer switch is configured to switch which power supply line is used.

In some embodiments, the power factor correction circuit 40 may be a bridgeless factor correction circuit; however, a type and structure of the power factor correction circuit is not limited in this disclosure.

Figure 2:
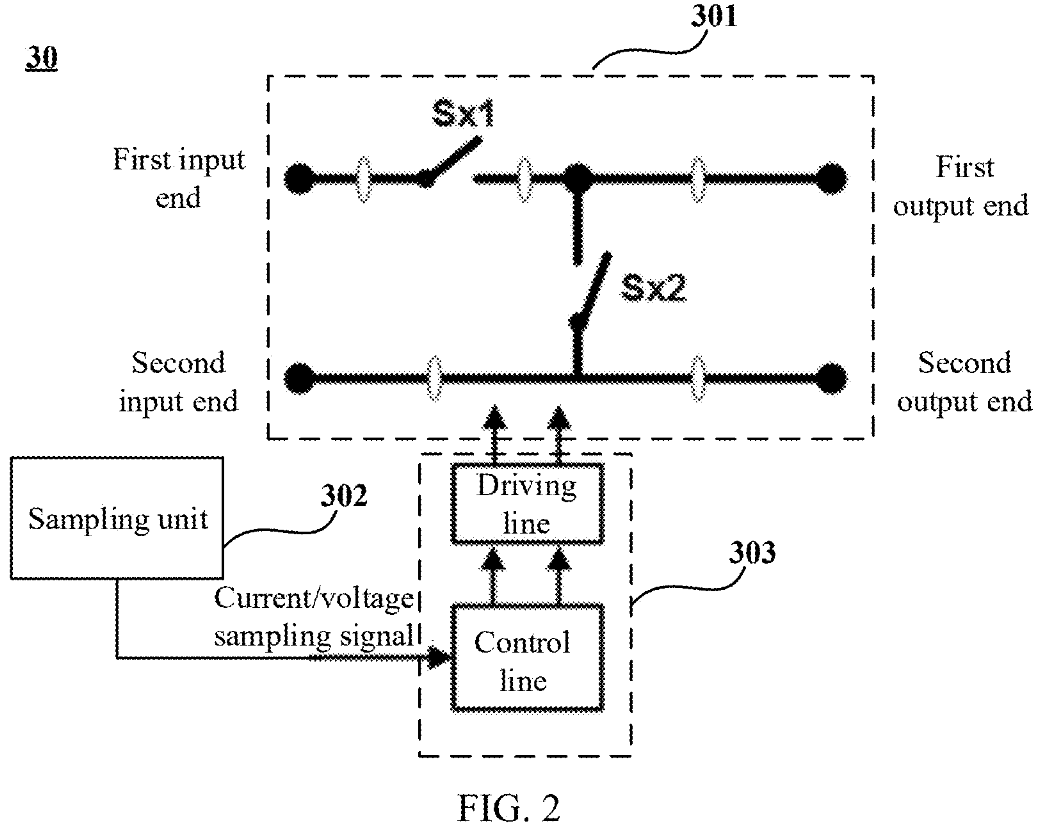
FIG. 2 is a circuit structure diagram of the active current limiting circuit in the embodiment of this disclosure.

FIG. 2 is a circuit structure diagram of the active current limiting circuit in the embodiment of this disclosure.

As shown in FIG. 2, the active current limiting circuit 30 includes a bidirectional switch unit 301, which includes at least one bidirectional switch. Description is given in FIG. 2 by taking two bidirectional switches as an example, namely, a first bidirectional switch Sx1 and a second bidirectional switch Sx2; however, this disclosure is not limited thereto, and the bidirectional switch unit 301 may include a bidirectional switch, or may include three or more bidirectional switches, and the number of unidirectional switches included in the bidirectional switch unit 301 may be determined as actually demanded.

An input end of the bidirectional switch unit 301 is connected to the input bus 20, and an output end of the bidirectional switch unit 301 is connected to the power factor correction circuit 40. The bidirectional switch unit 301 is configured to turn on or off at least one bidirectional switch according to the current sampling signal in the bidirectional switch unit 301, such as the first bidirectional switch Sx1 and the second bidirectional switch Sx2 in FIG. 2.

As shown in FIG. 2, a first end of the first bidirectional switch Sx1 is connected to the first input end of the bidirectional switch unit 301, a second end of the first bidirectional switch Sx1 is connected to a first output end of the bidirectional switch unit 301, a first end of the second bidirectional switch Sx2 is connected to the second input end of the bidirectional switch unit 301, and a second end of the second bidirectional switch Sx2 is connected to the first output end of the bidirectional switch unit 301, and the second input end is connected to the second output end of the bidirectional switch unit 301.

In addition, the first input end and the second input end of the bidirectional switch unit 301 are connected to the input bus 20.

In some embodiments, as shown in FIG. 2, the active current limiting circuit 30 further includes a sampling unit 302 and a control unit 303, wherein the sampling unit 302 is configured to sample a current in one of branches in the bidirectional switch unit 301 to obtain the current sampling signal; for example, the sampling unit 302 samples the current on any one of branches marked with an ellipse in the bidirectional switch unit 301 in FIG. 2, i.e. any one of a first branch between the first end of the first bidirectional switch Sx1 and the first input end, a second branch between the second end of the second end of the first bidirectional switch Sx1 and the second end of the second bidirectional switch Sx2, a third branch between the second end of the second bidirectional switch Sx2 and the first output end, a fourth branch between the first end of the second bidirectional switch Sx2 and the second input end and a fifth branch between the first end of the second bidirectional switch Sx2 and the second output end.

The control unit 303 is, for example, composed of a control line and a driving circuit, and is configured to generate a control signal for controlling turning on or off of the first bidirectional switch Sx1 and the second bidirectional switch Sx2 according to the current sampling signal, and drive the first bidirectional switch Sx1 and the second bidirectional switch Sx2 based on the control signal, so as to charge the capacitor CB or limit currents, that is, to follow the current of the first inductor L1 in the power factor correction circuit 40 to achieve a function of current limiting.

In some embodiments, the control unit 303 generates a first control signal when an absolute value of the current sampling signal is less than a first threshold, and drives the first bidirectional switch Sx1 and the second bidirectional switch Sx2 based on the first control signal, so that the power factor correction circuit 40 charges the capacitor CB;

and the control unit 303 generates a second control signal when the absolute value of the current sampling signal is greater than or equal to the first threshold, and drives the first bidirectional switch Sx1 and the second bidirectional switch Sx2 based on the second control signal to limit currents.

In some embodiments, the specific value of the first threshold may be set according to an actual situation.

As shown in FIG. 1 and FIG. 2, the power factor correction circuit 40 includes a first switch S1, a second switch S2, a third switch S3, a fourth switch S4 and a first inductor L1, an input end of the first inductor L1 being connected to the first output end of the bidirectional switch unit 401, an output end of the first inductor L1 being connected at a first terminal T1 between the first switch S1 and the second switch S2, and the second output end of the bidirectional switch unit 301 being connected at a second terminal T2 between the third switch S3 and the fourth switch S4. In addition, the first end of the first switch S1 and the first end of the second switch S2 are connected to the first terminal T1, the first end of the third switch S3 is connected to the second end of the first switch S1 and a positive pole of the capacitor CB, the second end of the third switch S3 and the first end of the fourth switch S4 are connected to the second terminal T2, and a second end of the fourth switch S4 is connected to the second end of the second switch S2 and a negative pole of the capacitor CB.

In some embodiments, S1 may be conducted at least from T1 to +bulk (the positive pole of the capacitor CB), S2 may be conducted at least from −bulk (the negative pole of the capacitor CB) to T1, S3 may be conducted at least from T2 to +bulk, and S4 may be conducted at least from −bulk to T2.

For example, a control process of the active current limiting circuit 30 is as follows: when the absolute value of the current sampling signal is less than the first threshold, the control unit 303 generates a first control signal that turns on the first bidirectional switch Sx1 and turns off the second bidirectional switch Sx2, and drives the first bidirectional switch Sx1 and the second bidirectional switch Sx2 based on the first control signal, so that the input voltage of the power factor correction circuit 40 charges the capacitor CB via the first inductor L1, the first switch S1 and the fourth switch S4 or via the first inductor L1, the second switch S2 and the third switch S3;

and when the absolute value of the current sampling signal is greater than or equal to the first threshold, the control unit 303 generates a second control signal that turns off the first bidirectional switch Sx1 and turns on the second bidirectional switch Sx2, and drives the first bidirectional switch Sx1 and the second bidirectional switch Sx2 based on the second control signal, so as to follow the current of the first inductor L1 of the power factor correction circuit 40 via the second bidirectional switch Sx2, the first switch S1 and the fourth switch S4 or via the second bidirectional switch Sx2, the second switch S2 and the third switch S3 to limit currents.

The control process of the control unit 303 is explained above by taking that the bidirectional switch unit 301 includes a first bidirectional switch and a second bidirectional switch as an example. The bidirectional switch unit 301 of this disclosure may also use other numbers of bidirectional switches, such as one or three bidirectional switches, and the control unit 303 controls the one or three bidirectional switches based on the current sampling signal to charge the capacitor CB, or follows current of the inductor of the power factor correction circuit to limit currents.

In some embodiments, the first switch S1 and the second switch S2 are controllable switch tubes, such as an Si MOS, an SIC MOS, and a GaN HEMT. And furthermore, the first switch S1 and the second switch S2 may operate in a high-frequency mode.

The third switch S3 and the fourth switch S4 are diodes or controllable switch tubes, such as an Si MOS, an SIC MOS, and a GaN HEMT. And furthermore, the third switch S3 and the fourth switch S4 may operate in an input operating-frequency mode; wherein the controllable switch tube works as a synchronous rectifier tube to reduce conduction loss of a diode.

That is, a frequency F1 of switches S1 and S2 in operation is greater than a frequency F2 of switches S3 and S4 in operation.

In some embodiments, the second switch S2 and the fourth switch S4 are controllable switch tubes, such as Si MOSs, SIC MOSs, and GaN HEMTs. In addition, the second switch S2 and the fourth switch S4 may operate in a high-frequency or low-frequency mode according to positive or negative input voltage;

and the first switch S1 and the third switch S3 are diodes or controllable switch tubes, such as Si MOSs, SIC MOSs, and GaN HEMTs, and may operate in a high-frequency or low-frequency mode according to positive or negative input voltage; wherein a controllable switch tube works as a synchronous rectifier tube to reduce conduction loss of a diode.

In some embodiments, the power factor correction circuit 40 further includes a fifth switch S5 arranged between the first terminal T1 and the second terminal T2. The fifth switch S5 is a bidirectional switch, and in addition, the fifth switch S5 may operate in a high-frequency mode.

In this case, the first switch S1, the second switch S2, the third switch S3 and the fourth switch S4 are diodes or controllable switch tubes, such as Si MOSs, SIC MOSs, and GaN HEMTs; wherein a controllable switch tube works as a synchronous rectifier tube to reduce conduction loss of a diode.

Figure 3:
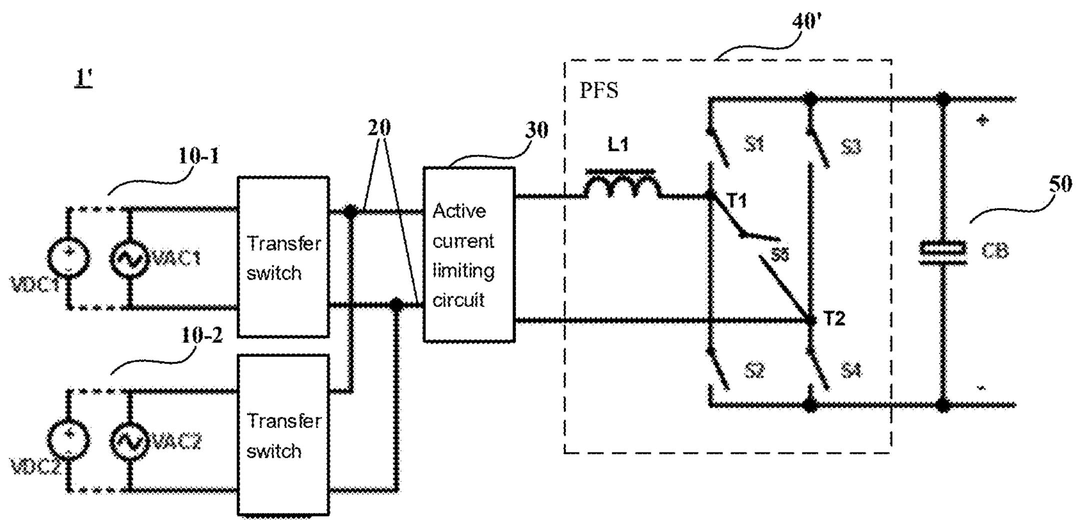
FIG. 3 is another circuit structure diagram of the power supply system where the active current limiting circuit is located in the embodiment of this disclosure.
Figure 4:
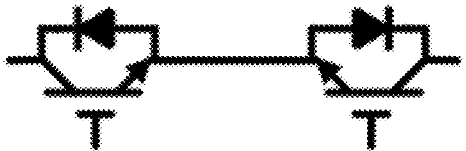
FIG. 4 is a schematic diagram of a structure of the bidirectional switch in the embodiment of this disclosure.
Figure 5:
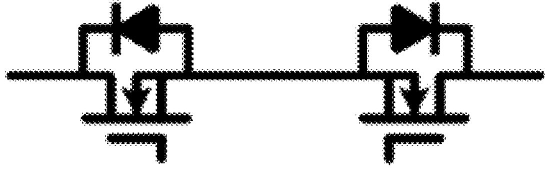
FIG. 5 is another schematic diagram of the structure of the bidirectional switch in the embodiment of this disclosure.
Figure 6:
FIG. 6 is a further schematic diagram of the structure of the bidirectional switch in the embodiment of this disclosure.
Figure 7:
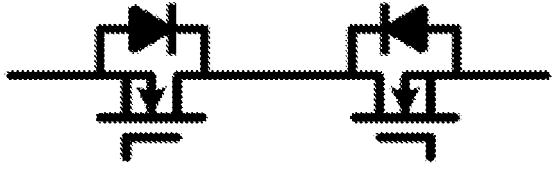
FIG. 7 is still another schematic diagram of the structure of the bidirectional switch in the embodiment of this disclosure.
Figure 8:
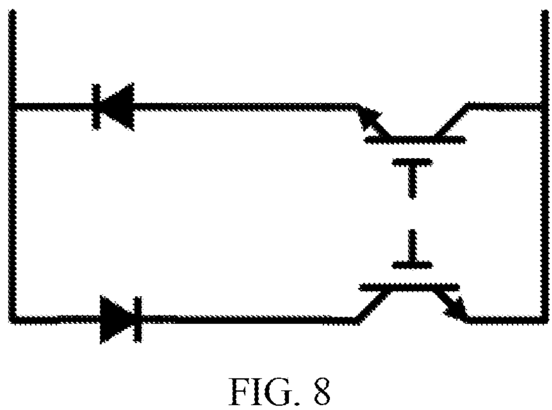
FIG. 8 is yet another schematic diagram of the structure of the bidirectional switch in the embodiment of this disclosure.

FIG. 3 is another circuit structure diagram of the power supply system where the active current limiting circuit is located in the embodiment of this disclosure. As shown in FIG. 3, a structure of power supply system 1' is similar to that of power supply system 1 shown in FIG. 1, and what is different from FIG. 1 is that in a power factor correction circuit 40', a fifth switch S5 is arranged between the first terminal T1 and the second terminal T2.

In the embodiment of this disclosure, a specific structure of the bidirectional switch in the current limiting switch unit may be designed as multiple structures.

FIG. 4 to FIG. 8 are schematic diagrams of different structures of the bidirectional switch of the embodiment of this disclosure. As shown in FIG. 4 to FIG. 8, for example, the first bidirectional switch Sx1 and/or the second bidirectional switch Sx2 are composed of two back-to-back IGBT tubes connected in series having parallel diodes, or the first bidirectional switch Sx1 and/or the second bidirectional switch Sx2 are composed of two back-to-back MOS tubes connected in series having parallel diodes, or the first bidirectional switch Sx1 and/or the second bidirectional switch Sx2 are composed of an IGBT tube and a diode connected in series, or the first bidirectional switch Sx1 and/or the second bidirectional switch Sx2 are composed of an IGBT tube and an MOS tube connected in series.

In some embodiments, the two IGBT tubes or two MOS tubes of the first bidirectional switch Sx1 use identical driving signals.

Figure 9:
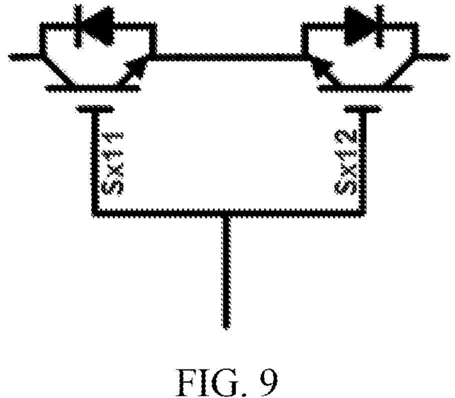
FIG. 9 is a circuit structure diagram of the first bidirectional switch in the embodiment of this disclosure.
Figure 10:
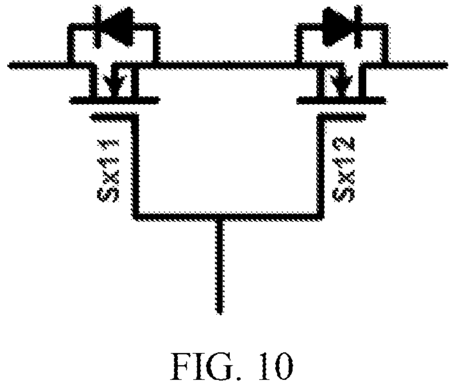
FIG. 10 is another circuit structure diagram of the first bidirectional switch in the embodiment of this disclosure.
Figure 11:
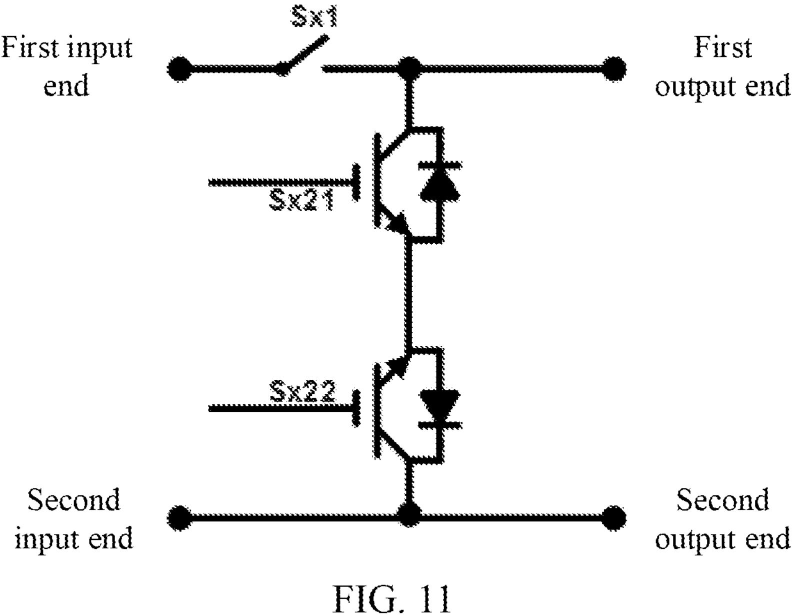
FIG. 11 is a schematic diagram of a structure of the second bidirectional switch in the embodiment of this disclosure.
Figure 12:
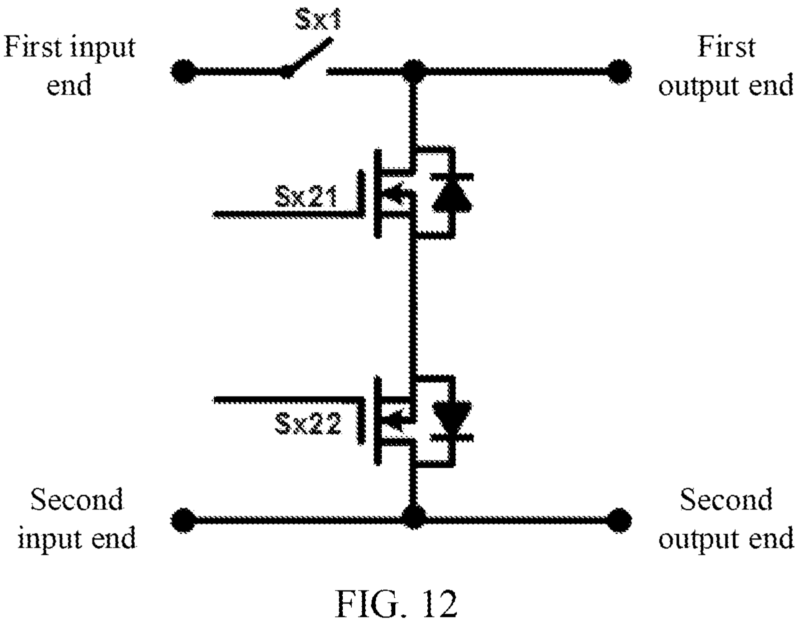
FIG. 12 is another schematic diagram of the structure of the second bidirectional switch in the embodiment of this disclosure.
Figure 13:
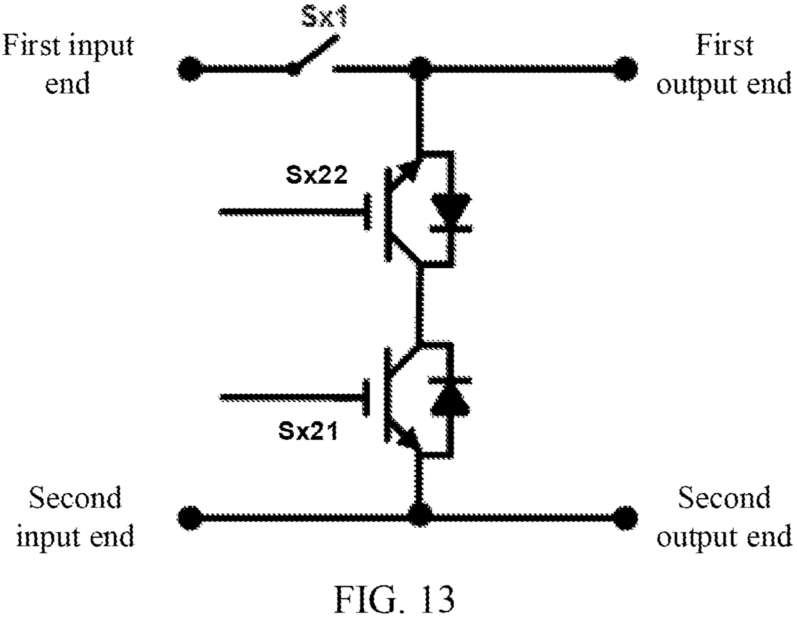
FIG. 13 is a further schematic diagram of the structure of the second bidirectional switch in the embodiment of this disclosure.
Figure 14:
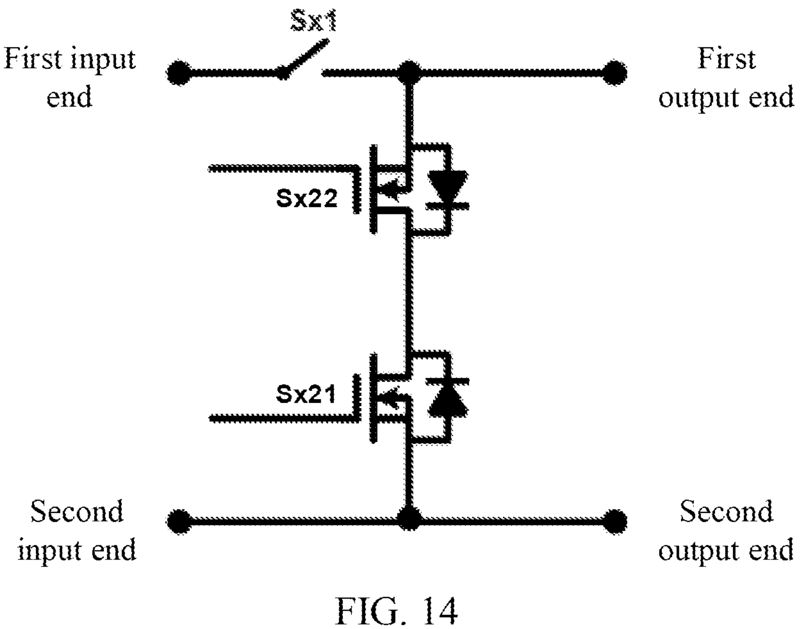
FIG. 14 is still another schematic diagram of the structure of the second bidirectional switch in the embodiment of this disclosure.

FIG. 9 is a circuit structure diagram of the first bidirectional switch Sx1 in the embodiment of this disclosure, and FIG. 10 is another circuit structure diagram of the first bidirectional switch Sx1 in the embodiment of this disclosure. As shown in FIG. 9, two IGBT tubes Sx11 and Sx12 of the first bidirectional switch Sx1 use identical driving signals; and as shown in FIG. 10, two MOS tubes Sx11 and Sx12 of the first bidirectional switch Sx1 use identical driving signals.

In some embodiments, as shown in FIG. 2, the sampling unit 302 is also configured to sample voltages at the first input end and second input end of the bidirectional switch unit, and the control unit 303 is also configured to generate control signals for controlling turning on or off of the two IGBT tubes or the two MOS tubes in the second bidirectional switch Sx2 according to the voltages at the first input end and second input end.

FIG. 11 to FIG. 14 are schematic diagrams of different structures of the second bidirectional switch in the embodiment of this disclosure. As shown in FIG. 11 to FIG. 14, for example, a control process is as follows: when the first voltage is higher than the second voltage, the control unit 303 generates a control signal for turning on a second IGBT tube or a second MOS tube Sx32 in the second bidirectional switch Sx2 having parallel diodes with a flowing direction from the first output end to the second output end; in addition, driving of the first IGBT tube or the first MOS tube Sx21 may be turned on or off according to the above current signal, and may flow via its own anti-parallel diodes.

When the first voltage is lower than the second voltage, the control unit 303 generates a control signal for turning on a first IGBT tube or a first MOS tube Sx21 in the second bidirectional switch Sx2 having parallel diodes with a flowing direction from the second output end to the first output end; in addition, driving of the first IGBT tube or the first MOS tube Sx22 may be turned on or off according to the above current signal, and may flow via its own anti-parallel diodes.

For example, after the control unit generates the control signal for turning on the second IGBT tube or the second MOS tube or the first IGBT tube or the first MOS tube Sx21 according to the voltages at the first input end and the second input end, when polarities of the voltages at the first input end and the second input end remain unchanged, the control unit always generates the control signal for turning on the second IGBT tube or the second MOS tube Sx22 or the first IGBT tube or the first MOS tube Sx21, and the control unit 303 also generates a control signal for controlling turning on or off of the first bidirectional switch Sx1 according to the current sampling signal;

and when the polarities of the voltages at the first input end and the second input end are changed, the control unit 303 generates a control signal for turning off the second bidirectional switch Sx2, generates a control signal for changing the IGBT tube or MOS tube that is turned on in the second bidirectional switch, and generates a control signal for turning on or turning off the first bidirectional switch Sx1 according to the current sampling signal.

In some embodiments, the control unit 303 may also use a fixed switching frequency to control the driving of the first bidirectional switch Sx1, wherein the first bidirectional switch Sx1 is turned on at a time within a switching period. When an absolute value of the current sampling signal is greater than a second threshold, the first bidirectional switch Sx1 is turned off, until a fixed time of a next switching period, and then the first bidirectional switch Sx1 is turned on. Wherein, a switching frequency may be selected as a fixed switching frequency according to the actual situation. In addition, a specific value of the second threshold may also be set according to an actual situation.

In some embodiments, the bidirectional switch unit 301 may further include a third bidirectional switch Sx3 in parallel with the first bidirectional switch Sx1. The third bidirectional switch Sx3 is configured to turn on when the power factor correction circuit 40 operates normally and turn off when the power factor correction circuit 40 charges the capacitor CB. In this way, losses during normal operation may be reduced, and overall efficiency may be improved.

Figure 15:
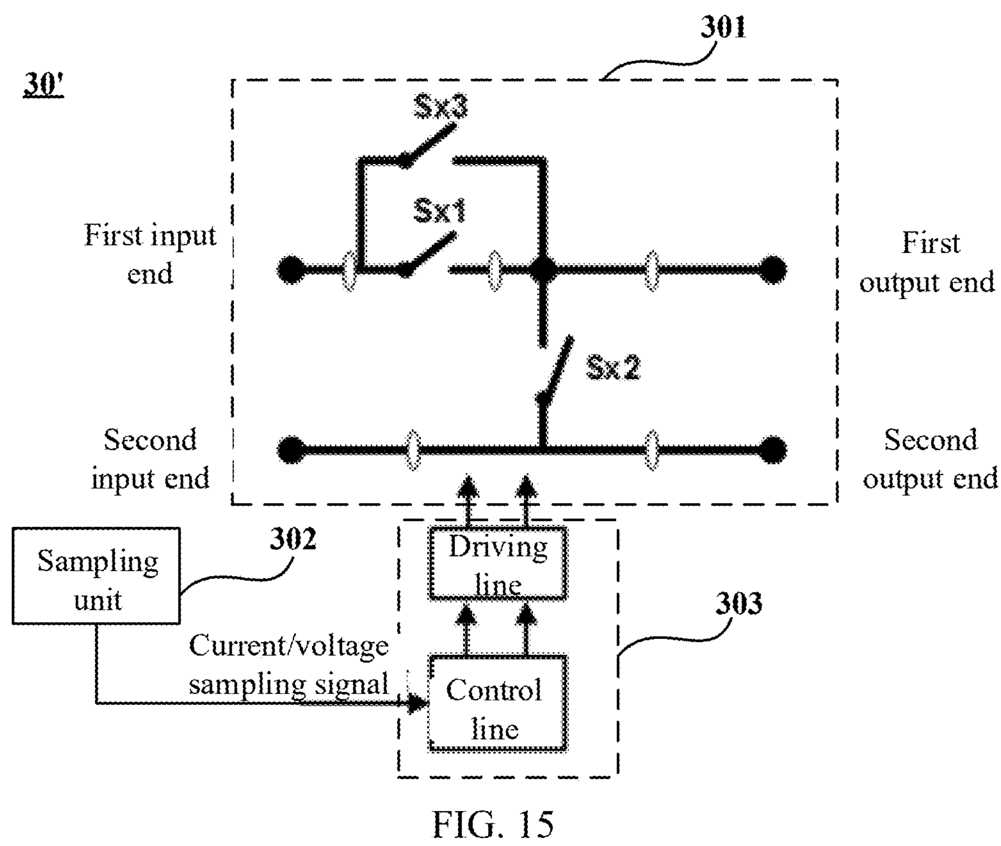
FIG. 15 is another circuit structure diagram of the power supply system where the active current limiting circuit is located in the embodiment of this disclosure.

FIG. 15 is another circuit structure diagram of the power supply system where the active current limiting circuit is located in the embodiment of this disclosure. As shown in FIG. 15, an active current limiting circuit 30' is similar to the active current limiting circuit 30 in FIG. 2, except that the bidirectional switch unit 301 further includes the third bidirectional switch Sx3 in parallel with the first bidirectional switch Sx1.

In some embodiments, the power factor correction circuit may further include a second inductor, a sixth switch and a seventh switch. An input end of the second inductor is connected to the first output end of the bidirectional switch unit 301, and the output end of the first inductor is connected to a third terminal between the sixth switch and the seventh switch. In this way, it may operate in a multiphase interlaced mode, and input ripple currents may be reduced.

Figure 16:
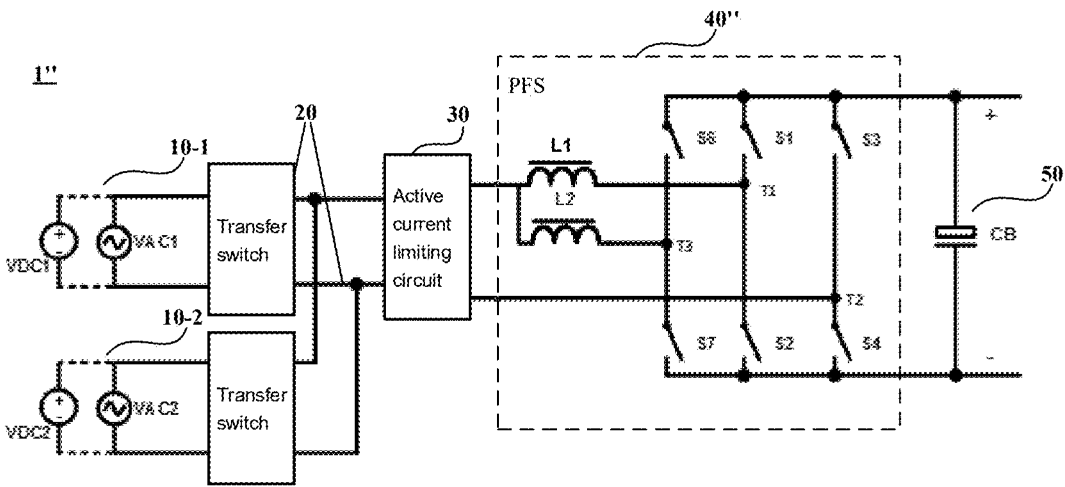
FIG. 16 is a further circuit structure diagram of the power supply system where the active current limiting circuit is located in the embodiment of this disclosure.

FIG. 16 is a further circuit structure diagram of the power supply system where the active current limiting circuit is located in the embodiment of this disclosure. As shown in FIG. 16, a structure of power supply system 1" is similar to that of power supply system 1 shown in FIG. 1, except that in a power factor correction circuit 40", the power factor correction circuit 40" further includes a second inductor L2, a sixth switch S6, and a seventh switch S7. An input end of the second inductor L2 is connected to the first output end of the bidirectional switch unit 301, and an output end of the second inductor L2 is connected to the third terminal T3 between the sixth switch S6 and the seventh switch S7.

In some embodiments, n groups of circuit structures including the inductor L2, the switch S6 and the switch S7 may be added to the power factor correction circuit 40"; where, n is a positive integer.

It should be noted that the circuit in the above example may further include components not shown in the drawings, and reference may be made to existing technologies for details, which are not limited in the embodiment of this disclosure. Or, the circuit does not necessarily include all the components shown in FIG. 1, which shall not be illustrated herein any further.

For the sake of simplicity, connection relationships between the components or modules or signal profiles thereof are only illustrated in FIG. 1 to FIG. 16. However, it should be understood by those skilled in the art that such related techniques as electrical connection, etc., may be adopted, which is not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that at least one bidirectional switch in the active current limiting circuit is turned on or off based on the current sampling signal obtained by sampling the current in the bidirectional switch in the active current limiting circuit. With the active current limiting circuit, the inrush current generated in switching the power supply lines may be efficiently reduced, power consumption may be lowered, output of large power may be provided, the capacitor may be charged and sufficient power output may be provided to the load. And furthermore, the bidirectional switch in the active current limiting circuit may be flexibly controlled based on the current sampling signal, thereby improving operating efficiency of the active current limiting circuit.

Embodiment 2

Figure 17:
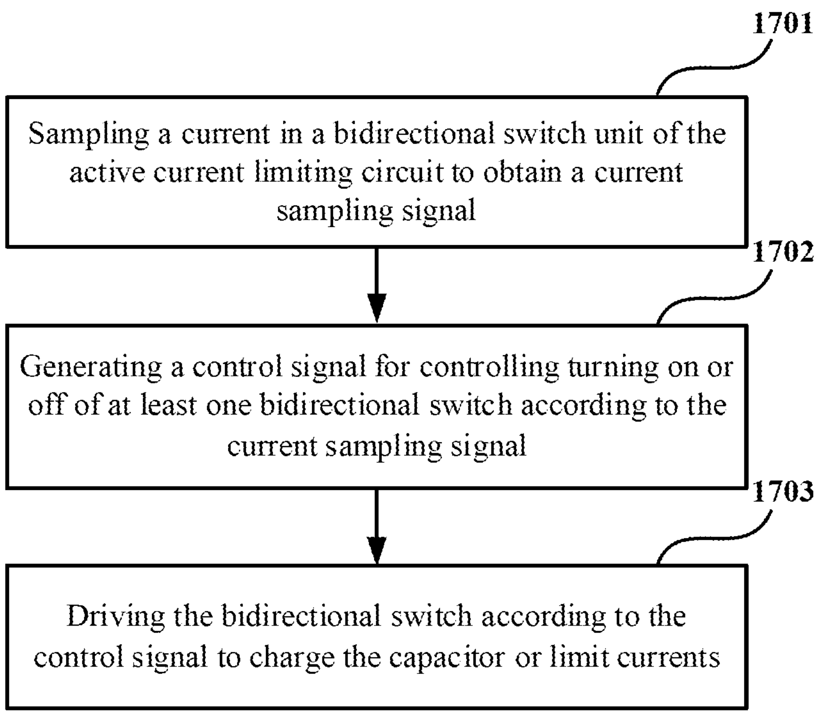
FIG. 17 is a schematic diagram of the control method in an embodiment of this disclosure.

The embodiments of this disclosure further provide a method for controlling an active current limiting circuit. FIG. 17 is a schematic diagram of the control method of an embodiment of this disclosure. As show in FIG. 17, the control method includes:

step 1701: sampling a current in a bidirectional switch unit of the active current limiting circuit to obtain a current sampling signal;

step 1702: generating a control signal for controlling turning on or off of at least one bidirectional switch according to the current sampling signal; and step 1703: driving the bidirectional switch according to the control signal to charge the capacitor or limit currents.

Reference may be made to Embodiment 1 for a specific structure of the active current limiting circuit and implementations of steps 1701 to 1703, with repeated parts being not going to be described herein any further.

In some embodiments, a control signal, including a first driving signal, may be generated according to a result of comparison an output voltage sampling signal and an output voltage reference signal, and a conduction time of the switch in the active current limiting circuit is controlled according to the first driving signal, and reference may be made to Embodiment 1 for details, which shall not be described herein any further.

For example, in step 1703, a first control signal is generated when an absolute value of the current sampling signal is less than a first threshold, and the bidirectional switch is driven based on the first control signal, so that input voltage of the power factor correction circuit charges the capacitor; and a second control signal is generated when the absolute value of the current sampling signal is greater than or equal to the first threshold, and the bidirectional switch is driven based on the second control signal to limit currents.

Reference may be made to the implementations of the functions of the control unit 301 and the control process in Embodiment 1 for specific contents of the control method in Embodiment 2, which shall not be repeated herein any further.

It can be seen from the above embodiment that at least one bidirectional switch in the active current limiting circuit is turned on or off based on the current sampling signal obtained by sampling the current in the bidirectional switch in the active current limiting circuit. With the active current limiting circuit, the inrush current generated in switching the power supply lines may be efficiently reduced, power consumption may be lowered, output of large power may be provided, the capacitor may be charged and sufficient power output may be provided to the load. And furthermore, the bidirectional switch in the active current limiting circuit may be flexibly controlled based on the current sampling signal, thereby improving operating efficiency of the active current limiting circuit.

The embodiment of this disclosure further provides a power supply device, including the active current limiting circuit as described in Embodiment 1. For example, the power supply device further includes a power factor correction circuit and a capacitor, with repeated parts being not going to be described herein any further.

The embodiment of this disclosure further provides a power supply system, including at least two input power supply lines, an input bus, a power factor correction circuit, a capacitor, and the active current limiting circuit as described in Embodiment 1, the power factor correction circuit being coupled via the input bus to the at least two input power supply lines that are able to be switched, and the capacitor being connected to an output side of the power factor correction circuit, such as the power supply system shown in FIG. 1 or FIG. 3 or FIG. 16.

An embodiment of this disclosure provides a computer readable program, which, when executed in a power supply device or an active current limiting circuit, will cause the active current limiting circuit to carry out the method as described in Embodiment 2.

An embodiment of this disclosure provides a computer readable medium, including a computer readable program code, which will cause a power supply device or an active current limiting circuit to carry out the method as described in Embodiment 2.

The circuit/method described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the steps shown in FIG. 17. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

While example embodiments have been particularly shown and described, it will be understood by those skilled in the art that various changes in form and details may be made therein without departing from the scope of the embodiments encompassed by the appended claims.

What is claimed is:

1. An active current limiting circuit, characterized in that the active current limiting circuit is applicable to a power supply system, the power supply system comprising at least two input power supply lines, an input bus, a power factor correction circuit, a capacitor, and the active current limiting circuit, the power factor correction circuit being coupled via the input bus to the at least two input power supply lines that are able to be switched, and the capacitor being connected to an output side of the power factor correction circuit, and the active current limiting circuit comprising: a bidirectional switch unit comprising at least one bidirectional switch, wherein an input end of the bidirectional switch unit is connected to the input bus, and an output end of the bidirectional switch unit is connected to the power factor correction circuit, the bidirectional switch unit being configured to turn on or off the at least one bidirectional switch according to a current sampling signal in the bidirectional switch unit to charge the capacitor or limit currents, the bidirectional switch comprises a first bidirectional switch and a second bidirectional switch, a first end of the first bidirectional switch being connected to a first input end of the bidirectional switch unit, a second end of the first bidirectional switch being connected to a first output end of the bidirectional switch unit, a first end of the second bidirectional switch being connected to a second input end of the bidirectional switch unit, a second end of the second bidirectional switch being connected to the first output end of the bidirectional switch unit, and the second input end being connected to the second output end of the bidirectional switch unit.

2. The active current limiting circuit according to claim 1, characterized in that the active current limiting circuit further comprises:

a sampling unit configured to sample a current in one of branches in the bidirectional switch unit to obtain the current sampling signal; and a control unit configured to generate a control signal for controlling turning on or off of the at least one bidirectional switch according to the current sampling signal, and drive the bidirectional switch based on the control signal to charge the capacitor or limit currents.

3. The active current limiting circuit according to claim 2, characterized in that, the control unit is configured to generate a first control signal when an absolute value of the current sampling signal is less than a first threshold, and drive the bidirectional switch based on the first control signal, so that the power factor correction circuit charges the capacitor; and generate a second control signal when the absolute value of the current sampling signal is greater than or equal to the first threshold, and drive the bidirectional switch based on the second control signal to limit currents.

4. The active current limiting circuit according to claim 1, characterized in that, the power factor correction circuit comprises a first switch, a second switch, a third switch, a fourth switch and a first inductor, an input end of the first inductor being connected to the first output end of the bidirectional switch unit, an output end of the first inductor being connected at a first terminal between the first switch and the second switch, and the second output end of the bidirectional switch unit being connected at a second terminal between the third switch and the fourth switch.

5. The active current limiting circuit according to claim 1, characterized in that, the first bidirectional switch and/or the second bidirectional switch is/are composed of two back-to-back IGBT tubes connected in series having parallel diodes, or, the first bidirectional switch and/or the second bidirectional switch is/are composed of two back-to-back MOS tubes connected in series having parallel diodes, or, the first bidirectional switch and/or the second bidirectional switch is/are composed of an IGBT tube and a diode connected in series, or the first bidirectional switch and/or the second bidirectional switch is/are composed of an IGBT tube and an MOS tube connected in series.

6. The active current limiting circuit according to claim 5, characterized in that, the sampling unit is further configured to sample voltages at the first input end and the second input end of the bidirectional switch unit, and the control unit is further configured to generate a control signal for controlling turning on or off of the two IGBT tubes or the two MOS tubes in the second bidirectional switch according to the voltages at the first input end and the second input end.

7. The active current limiting circuit according to claim 1, characterized in that, the control unit controls driving of the first bidirectional switch by using a fixed switching frequency.

8. The active current limiting circuit according to claim 1, characterized in that, the bidirectional switch unit further comprises a third bidirectional switch in parallel with the first bidirectional switch, the third bidirectional switch being configured to be turned on when the power factor correction circuit operates normally and turned off when the power factor correction circuit charges the capacitor.

9. A power supply device, characterized in that the power supply device comprises the active current limiting circuit as claimed in claim 1.

10. The power supply device according to claim 9, characterized in that the active current limiting circuit further comprises:

a sampling unit configured to sample a current in one of branches in the bidirectional switch unit to obtain the current sampling signal; and a control unit configured to generate a control signal for controlling turning on or off of the at least one bidirectional switch according to the current sampling signal, and drive the bidirectional switch based on the control signal to charge the capacitor or limit currents.

11. A power supply system, characterized in that the power supply system comprises the at least two input power supply lines, the input bus, the power factor correction circuit, the capacitor, and the active current limiting circuit as claimed in claim 1, the power factor correction circuit being coupled via the input bus to the at least two input power supply lines that are able to be switched, and the capacitor being connected to an output side of the power factor correction circuit.

12. A method for controlling the active current limiting circuit as claimed in claim 1, characterized in that the method comprises:

sampling a current in a bidirectional switch unit of the active current limiting circuit as claimed in claim 1 to obtain a current sampling signal;

generating a control signal for controlling turning on or off of at least one bidirectional switch according to the current sampling signal; and driving the bidirectional switch according to the control signal to charge the capacitor or limit currents, the bidirectional switch comprises a first bidirectional switch and a second bidirectional switch, a first end of the first bidirectional switch being connected to a first input end of the bidirectional switch unit, a second end of the first bidirectional switch being connected to a first output end of the bidirectional switch unit, a first end of the second bidirectional switch being connected to a second input end of the bidirectional switch unit, a second end of the second bidirectional switch being connected to the first output end of the bidirectional switch unit, and the second input end being connected to the second output end of the bidirectional switch unit.

13. The method according to claim 12, characterized in that, a first control signal is generated when an absolute value of the current sampling signal is less than a first threshold, and the bidirectional switch is driven based on the first control signal, so that input voltage of the power factor correction circuit charges the capacitor;

and a second control signal is generated when the absolute value of the current sampling signal is greater than or equal to the first threshold, and the bidirectional switch is driven based on the second control signal to limit currents.

14. The method according to claim 13, characterized in that, the power factor correction circuit comprises a first switch, a second switch, a third switch, a fourth switch and a first inductor, an input end of the first inductor being connected to the first output end of the bidirectional switch unit, an output end of the first inductor being connected at a first terminal between the first switch and the second switch, and the second output end of the bidirectional switch unit being connected at a second terminal between the third switch and the fourth switch.

15. The method according to claim 13, characterized in that, the first bidirectional switch and/or the second bidirectional switch is/are composed of two back-to-back IGBT tubes connected in series having parallel diodes, or, the first bidirectional switch and/or the second bidirectional switch is/are composed of two back-to-back MOS tubes connected in series having parallel diodes, or, the first bidirectional switch and/or the second bidirectional switch is/are composed of an IGBT tube and a diode connected in series, or the first bidirectional switch and/or the second bidirectional switch is/are composed of an IGBT tube and an MOS tube connected in series.

16. The method according to claim 15, characterized in that, the sampling unit is further configured to sample voltages at the first input end and the second input end of the bidirectional switch unit, and the control unit is further configured to generate a control signal for controlling turning on or off of the two IGBT tubes or the two MOS tubes in the second bidirectional switch according to the voltages at the first input end and the second input end.

17. The method according to claim 13, characterized in that, the control unit controls driving of the first bidirectional switch by using a fixed switching frequency.

18. The method according to claim 13, characterized in that, the bidirectional switch unit further comprises a third bidirectional switch in parallel with the first bidirectional switch, the third bidirectional switch being configured to be turned on when the power factor correction circuit operates normally and turned off when the power factor correction circuit charges the capacitor.

* * * * *